(12) United States Patent
Kamegawa

(10) Patent No.: US 12,463,486 B2
(45) Date of Patent: Nov. 4, 2025

(54) STATOR WITH COAT-REMOVED PORTIONS OF ELECTRICAL CONDUCTOR WIRES AND METHOD OF MANUFACTURING SAME

(71) Applicant: DENSO CORPORATION, Kariya (JP)

(72) Inventor: Norio Kamegawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 310 days.

(21) Appl. No.: 17/873,527

(22) Filed: Jul. 26, 2022

(65) Prior Publication Data

US 2023/0026208 A1 Jan. 26, 2023

(30) Foreign Application Priority Data

Jul. 26, 2021 (JP) .................................. 2021-121915

(51) Int. Cl.
*H02K 3/38* (2006.01)
*B23K 26/354* (2014.01)
(Continued)

(52) U.S. Cl.
CPC ............. *H02K 3/38* (2013.01); *B23K 26/354* (2015.10); *H02K 3/28* (2013.01); *H02K 3/34* (2013.01);
(Continued)

(58) Field of Classification Search
CPC ............. H02K 15/085; H02K 15/0068; H02K 15/0081; H02K 3/30; H02K 2203/09;
(Continued)

(56) References Cited

U.S. PATENT DOCUMENTS 6,366,000 B1* 4/2002 Higashino ................ H02K 9/06
310/43
6,915,556 B2* 7/2005 Lenoir .................... H02K 15/35
29/598
(Continued)

FOREIGN PATENT DOCUMENTS

DE 202014003844 U1 * 6/2014 ............. H02K 3/522
DE 10 2019 109 060 A1 6/2020
(Continued)

OTHER PUBLICATIONS

Translation of WO 2018028856 A1 (Year: 2018).*

*Primary Examiner* — Oluseye Iwarere
*Assistant Examiner* — Daniel K Schlak
(74) *Attorney, Agent, or Firm* — Oliff PLC

(57) ABSTRACT

A stator has a stator coil provided on an annular stator core. The stator coil is formed of electrical conductor wires each including an electrical conductor and an insulating coat. Each of the electrical conductor wires has a pair of exposed portions where the electrical conductor is exposed from the insulating coat and a covered portion where the electrical conductor is covered with the insulating coat. The pair of exposed portions are formed respectively at opposite end portions of the electrical conductor wire. The covered portion is formed at other portions of the electrical conductor wire than the end portions. At a coil end part of the stator coil, each corresponding pair of the exposed portions of the electrical conductor wires are welded together and each of the covered portions of the electrical conductor wires includes a coat-removed portion where the insulating coat is locally removed from the covered portion.

8 Claims, 10 Drawing Sheets

(51) Int. Cl.
*H02K 3/28* (2006.01)
*H02K 3/34* (2006.01)
*H02K 15/12* (2025.01)
*H02K 15/33* (2025.01)
H02K 3/12 (2006.01)
H02K 15/0421 (2025.01)
H02K 15/085 (2006.01)

(52) U.S. Cl.
CPC ............. *H02K 15/12* (2013.01); *H02K 15/33* (2025.01); *H02K 3/12* (2013.01); *H02K 15/0421* (2013.01); *H02K 15/085* (2013.01); *H02K 2203/09* (2013.01)

(58) Field of Classification Search
CPC . H02K 3/38; H02K 3/40; H02K 3/505; B23K 26/354
See application file for complete search history.

(56) References Cited

U.S. PATENT DOCUMENTS

| | | | | |
|---|---|---|---|---|
| 10,763,730 | B2* | 9/2020 | Hashimoto | H02K 15/105 |
| 2003/0127934 | A1* | 7/2003 | Koike | H02K 15/35 |
| | | | | 310/201 |
| 2003/0135980 | A1 | 7/2003 | Ichikawa et al. | |
| 2005/0116571 | A1 | 6/2005 | Ichikawa et al. | |
| 2005/0217105 | A1 | 10/2005 | Ichikawa et al. | |
| 2006/0267440 | A1* | 11/2006 | Sakai | H02K 15/064 |
| | | | | 310/184 |
| 2008/0191574 | A1* | 8/2008 | Tokizawa | H02K 3/12 |
| | | | | 310/179 |
| 2013/0207492 | A1* | 8/2013 | Chamberlin | H02K 3/38 |
| | | | | 310/59 |
| 2013/0300246 | A1* | 11/2013 | Kaimori | B60L 3/0061 |
| | | | | 310/201 |
| 2014/0183985 | A1* | 7/2014 | Kurahara | H02K 3/38 |
| | | | | 29/596 |
| 2014/0246929 | A1* | 9/2014 | Francese | H02K 9/223 |
| | | | | 310/52 |
| 2014/0300237 | A1* | 10/2014 | Tokizawa | H02K 3/12 |
| | | | | 310/201 |
| 2017/0126106 | A1* | 5/2017 | Mizushima | H02K 15/085 |
| 2018/0036836 | A1* | 2/2018 | Nakamura | B23K 26/0736 |
| 2018/0262071 | A1* | 9/2018 | Nishikuma | H02K 3/14 |
| 2019/0013720 | A1* | 1/2019 | Pydin | H02K 15/021 |
| 2019/0036429 | A1* | 1/2019 | Wang | B23K 26/352 |
| 2019/0097506 | A1* | 3/2019 | Hashimoto | H02K 15/10 |
| 2019/0199153 | A1* | 6/2019 | Nishimura | H02K 15/35 |
| 2019/0252957 | A1* | 8/2019 | Onda | H02K 15/105 |
| 2019/0326801 | A1* | 10/2019 | Hein | H02K 3/14 |
| 2020/0083771 | A1* | 3/2020 | Azusawa | H02K 3/522 |
| 2020/0083787 | A1* | 3/2020 | Fujiyoshi | H02K 15/35 |
| 2020/0112236 | A1* | 4/2020 | Hirao | H01R 4/029 |
| 2020/0195108 | A1* | 6/2020 | Yamaji | H02K 7/006 |
| 2020/0328647 | A1* | 10/2020 | Katsuragi | H02K 3/38 |
| 2021/0083539 | A1* | 3/2021 | Maruyama | B21D 28/28 |
| 2021/0184533 | A1* | 6/2021 | Mashiko | H02K 15/32 |
| 2021/0359579 | A1* | 11/2021 | Fukuda | H02K 1/16 |
| 2022/0311318 | A1* | 9/2022 | Miyashita | H02K 3/12 |
| 2022/0371123 | A1* | 11/2022 | Mizushima | B23K 26/21 |
| 2022/0416630 | A1* | 12/2022 | Nakayama | H02K 3/345 |
| 2023/0006521 | A1* | 1/2023 | Ushida | H02K 15/04 |
| 2023/0010824 | A1* | 1/2023 | Ono | B23K 26/60 |
| 2023/0219170 | A1* | 7/2023 | Bocksrocker | B23K 26/362 |
| | | | | 219/121.67 |
| 2023/0283132 | A1* | 9/2023 | Heider | H02K 3/28 |
| | | | | 310/208 |

FOREIGN PATENT DOCUMENTS

| | | | |
|---|---|---|---|
| JP | S52-064602 A | 5/1977 | |
| JP | 2018-121396 A | 8/2018 | |
| JP | 2019-097326 A | 6/2019 | |
| JP | 2019-122187 A | 7/2019 | |
| JP | 2019-140822 A | 8/2019 | |
| JP | 2023002031 A * | 1/2023 | ............ H02K 15/12 |
| WO | WO-2018028856 A1 * | 2/2018 | ............ H02K 15/35 |
| WO | WO-2019159737 A1 * | 8/2019 | ........... H02K 15/085 |
| WO | WO-2019192763 A1 * | 10/2019 | ............ H02K 15/35 |
| WO | WO-2021048994 A1 * | 3/2021 | .............. H02K 3/50 |
| WO | WO-2021144937 A1 * | 7/2021 | ........... H02K 15/085 |

* cited by examiner

STATOR WITH COAT-REMOVED PORTIONS OF ELECTRICAL CONDUCTOR WIRES AND METHOD OF MANUFACTURING SAME

CROSS-REFERENCE TO RELATED APPLICATION

This application is based on and claims priority from Japanese Patent Application No. 2021-121915 filed on Jul. 26, 2021, the entire contents of which are hereby incorporated by reference into this application.

BACKGROUND

1 Technical Field

The present disclosure relates to stators for rotating electric machines and methods of manufacturing the stators.

2 Description of Related Art

A stator of a rotating electric machine generally has a stator coil wound on a stator core. During operation of the rotating electric machine, the temperature of the stator increases with supply of electric current to the stator coil; therefore, it is necessary to cool the stator. Moreover, the stator coil has a pair of coil end parts protruding respectively from opposite axial end faces of the stator core. The stator can be cooled by cooling the coil end parts.

SUMMARY

According to the present disclosure, there is provided a stator which includes an annular stator core and a stator coil provided on the stator core. The stator coil is formed of a plurality of electrical conductor wires each including an electrical conductor and an insulating coat covering the electrical conductor. Each of the electrical conductor wires has a pair of exposed portions where the electrical conductor is exposed from the insulating coat and a covered portion where the electrical conductor is covered with the insulating coat. The pair of exposed portions are formed respectively at opposite end portions of the electrical conductor wire. The covered portion is formed at other portions of the electrical conductor wire than the end portions. The stator coil has a coil end part protruding from an axial end face of the stator core. At the coil end part, each corresponding pair of the exposed portions of the electrical conductor wires are welded together and each of the covered portions of the electrical conductor wires has formed therein a coat-removed portion where the insulating coat is locally removed from the covered portion.

According to the present disclosure, there is also provided a method of manufacturing a stator. The stator includes an annular stator core and a stator coil provided on the stator core. The stator coil is formed of a plurality of electrical conductor wires each including an electrical conductor and an insulating coat covering the electrical conductor. The stator coil has a coil end part which protrudes from an axial end face of the stator core and at which the electrical conductor wires are arranged to overlap one another in an axial direction. Each of the electrical conductor wires has a pair of exposed portions where the electrical conductor is exposed from the insulating coat. The pair of exposed portions are formed respectively at opposite end portions of the electrical conductor wire. At the coil end part, each corresponding pair of the exposed portions of the electrical conductor wires are laser-welded together. The method includes: an assembly step of assembling the electrical conductor wires to the stator core; and a welding step of laser-welding each corresponding pair of the exposed portions of the electrical conductor wires by irradiating a laser beam in a laser irradiation direction to an overlap part between the pair of the exposed portions. Moreover, in the welding step, a coat-removed portion is formed by heat of the laser beam in at least one electrical conductor wire arranged behind the pair of the exposed portions in the laser irradiation direction. At the coat-removed portion, the insulating coat is removed from the at least one electrical conductor wire.

DESCRIPTION OF EMBODIMENT

Figure 1:
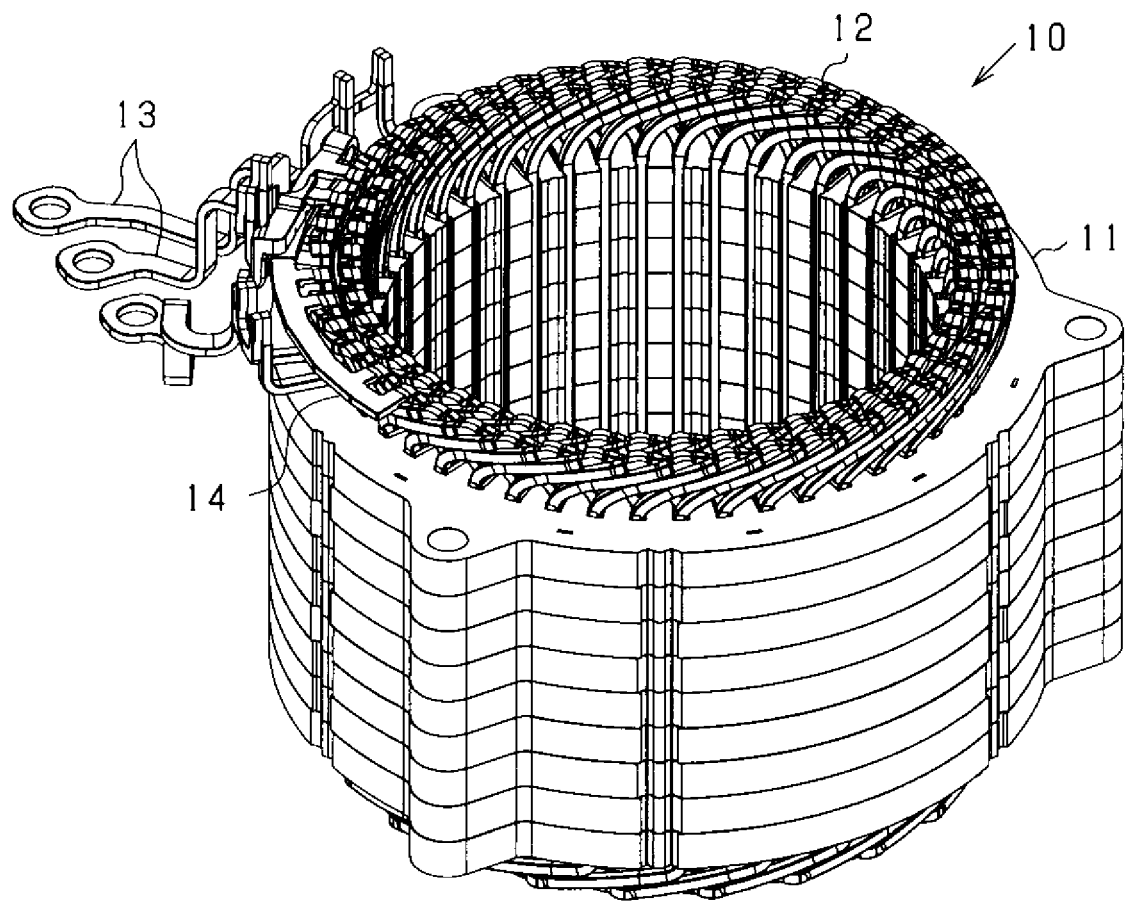
FIG. 1 is a perspective view of a stator according to an exemplary embodiment.

For example, Japanese Patent Application Publication No. JP 2019-122187 A discloses a stator coil which is formed of a plurality of electrical conductor segments. Specifically, distal end portions of the electrical conductor segments are welded to one another at one of the coil end parts of the stator coil. Moreover, residual voids are built in welds formed between the distal end portions of the electrical conductor segments. Due to the residual voids, the surfaces of the welds bulge out, increasing the surface areas of the welds. Consequently, it becomes possible to improve the heat dissipation performance at the welds, thereby suppressing increase in temperature at the welds.

However, for improving the output of the rotating electric machine, it is desired to further improve the cooling performance at the stator coil.

The present disclosure has been accomplished in view of the above circumstances.

In the above-described stator according to the present disclosure, at the coil end part of the stator coil, the electrical conductor is exposed from the insulating coat at the exposed portions of the electrical conductor wires, but covered with the insulating coat at the covered portions (i.e., the other portions) of the electrical conductor wires. Therefore, heat dissipation of the electrical conductor wires may be limited. In this regard, according to the present disclosure, at the coil end part, each of the covered portions of the electrical conductor wires has formed therein at least one coat-removed portion where the insulating coat is locally removed from the covered portion. Consequently, it becomes possible to improve the heat dissipation performance of the electrical conductor wires. As a result, it becomes possible to improve the cooling performance at the coil end part, thereby suitably suppressing increase in the temperature of the stator.

In further implementations of the stator according to the present disclosure, at the coil end part, the electrical conductor wires are arranged to overlap one another in an axial direction. In each of the covered portions of the electrical conductor wires, the coat-removed portion is formed on an opposite side of the covered portion to the stator core in the axial direction.

With the above configuration, at the coil end part of the stator coil, the electrical conductor wires, each of which constitutes a heat source, are arranged to overlap one another in the axial direction. Therefore, for each of the covered portions of the electrical conductor wires, the ambient temperature on the stator core side of the covered portion is higher than that on the opposite side of the covered portion to the stator core in the axial direction. In consideration of the above, in each of the covered portions of the electrical conductor wires, the coat-removed portion is formed on the opposite side of the covered portion to the stator core in the axial direction. Consequently, it becomes possible to dissipate heat of the electrical conductor wires through the respective coat-removed portions thereof on the opposite side to the stator core where the ambient temperature is relatively low. As a result, it becomes possible to further improve the heat dissipation performance of the electrical conductor wires.

At the coil end part, there is provided a resin encapsulating member that is formed of an electrically insulative resin having a higher thermal conductivity than the insulating coats of the electrical conductor wires. In the resin encapsulating member, there are encapsulated, at least, the exposed portions and the coat-removed portions of the electrical conductor wires.

With the above configuration, at the coil end part of the stator coil, the exposed portions and the coat-removed portions of the electrical conductor wires are encapsulated in the resin encapsulating member that is formed of the electrically insulative resin having a higher thermal conductivity than the insulating coats of the electrical conductor wires. Consequently, it becomes possible to dissipate heat of the electrical conductor wires through the respective coat-removed portions thereof and via the resin encapsulating member while ensuring electrical insulation between the electrical conductor wires. As a result, it becomes possible to improve the heat dissipation performance of the electrical conductor wires while ensuring electrical insulation between the electrical conductor wires.

At the coil end part, each corresponding pair of the exposed portions of the electrical conductor wires are laser-welded together by irradiating a laser beam to the exposed portions from an opposite side of the exposed portions to the stator core in the axial direction. The electrical conductor wires forming the stator coil include a pair of first electrical conductor wires whose exposed portions are laser-welded together, and at least one electrical conductor wire different from the pair of first electrical conductor wires and arranged on the stator core side of the exposed portions of the pair of first electrical conductor wires in the axial direction. In the at least one electrical conductor wire different from the pair of first electrical conductor wires, the coat-removed portion is formed to be adjacent to the exposed portions of the pair of first electrical conductor wires in the axial direction.

With the above configuration, during the laser welding of the exposed portions of the pair of first electrical conductor wires, the laser beam penetrates the exposed portions to reach the at least one electrical conductor wire different from the pair of first electrical conductor wires. Consequently, the insulating coat of the at least one electrical conductor wire different from the pair of first electrical conductor wires can be locally removed by heat of the laser beam. As a result, it becomes possible to suitably form the coat-removed portion in the at least one electrical conductor wire different from the pair of first electrical conductor wires, thereby allowing heat of the at least one electrical conductor wire to be suitably dissipated through the coat-removed portion.

At the coil end part, the exposed portions of the pair of first electrical conductor wires are laser-welded together in a state of being radially overlapped with each other. In the at least one electrical conductor wire different from the pair of first electrical conductor wires, the coat-removed portion is formed in a wider range in a longitudinal direction of the at least one electrical conductor wire than an overlap range in which the exposed portions of the pair of first electrical conductor wires are radially overlapped with each other.

With the coat-removed portion formed in the wider range than the overlap range between the exposed portions of the pair of first electrical conductor wires, it becomes possible to enhance the heat dissipation of the at least one electrical conductor wire through the coat-removed portion.

The at least one electrical conductor wire different from the pair of first electrical conductor wires includes a pair of second electrical conductor wires arranged respectively on opposite sides of a boundary between the exposed portions of the pair of first electrical conductor wires. In the pair of second electrical conductor wires, the coat-removed portions are formed in opposing surfaces of the pair of second electrical conductor wires as well as in side surfaces of the pair of second electrical conductor wires. The opposing surfaces of the pair of second electrical conductor wires are opposed to each other; and the side surfaces of the pair of second electrical conductor wires face the exposed portions of the pair of first electrical conductor wires in the axial direction.

With the above arrangement of the pair of second electrical conductor wires, during the laser welding of the exposed portions of the pair of first electrical conductor wires, the laser beam penetrates the exposed portions to reach the pair of second electrical conductor wires. Consequently, both the insulating coats of the pair of second electrical conductor wires can be locally removed by heat of the laser beam. As a result, it becomes possible to suitably form the coat-removed portions in the opposing surfaces of the pair of second electrical conductor wires as well as in the side surfaces of the pair of second electrical conductor wires.

The at least one electrical conductor wire different from the pair of first electrical conductor wires further includes a third electrical conductor wire arranged so as to overlap, in the axial direction, the boundary between the exposed portions of the pair of first electrical conductor wires. In the third electrical conductor wire, the coat-removed portion is formed in a side surface of the third electrical conductor wire, the side surface of the third electrical conductor wire facing the exposed portions of the pair of first electrical conductor wires in the axial direction.

With the above arrangement of the third electrical conductor wire, during the laser welding of the exposed portions of the pair of first electrical conductor wires, the laser beam penetrates the exposed portions to reach the third electrical conductor wire. Consequently, the insulating coat of the third electrical conductor wire can be locally removed by heat of the laser beam. As a result, it becomes possible to suitably form the coat-removed portion in the side surface of the third electrical conductor wire. Moreover, with the above arrangement of the third electrical conductor wire, although the laser beam penetrates the exposed portions of the pair of first electrical conductor wires, it is blocked by the third electrical conductor wire from reaching the stator core. Consequently, it becomes possible to protect the stator core from the laser beam.

Furthermore, with the above-described method according to the present disclosure, in the welding step, the coat-removed portion is formed in the at least one electrical conductor wire by heat of the laser beam irradiated to the overlap part between the pair of the exposed portions. As a result, it becomes possible to suitably manufacture the stator capable of improving the cooling performance at the coil end part.

In a further implementation of the method according to the present disclosure, in the assembly step, the electrical conductor wires are assembled to the stator core so that at the coil end part, each corresponding pair of the exposed portions of the electrical conductor wires are radially overlapped with each other. In the welding step, for each corresponding pair of the exposed portions of the electrical conductor wires, the laser beam is traversed in a laser traversing range wider than an overlap range in which the pair of the exposed portions are radially overlapped with each other, thereby forming the coat-removed portion in the at least one electrical conductor wire in a wider range in a longitudinal direction of the at least one electrical conductor wire than the overlap range.

Consequently, with the coat-removed portion formed in the wider range than the overlap range, it becomes possible to enhance the heat dissipation of the at least one electrical conductor wire through the coat-removed portion.

One exemplary embodiment will be described hereinafter with reference to the drawings.

Figure 2:
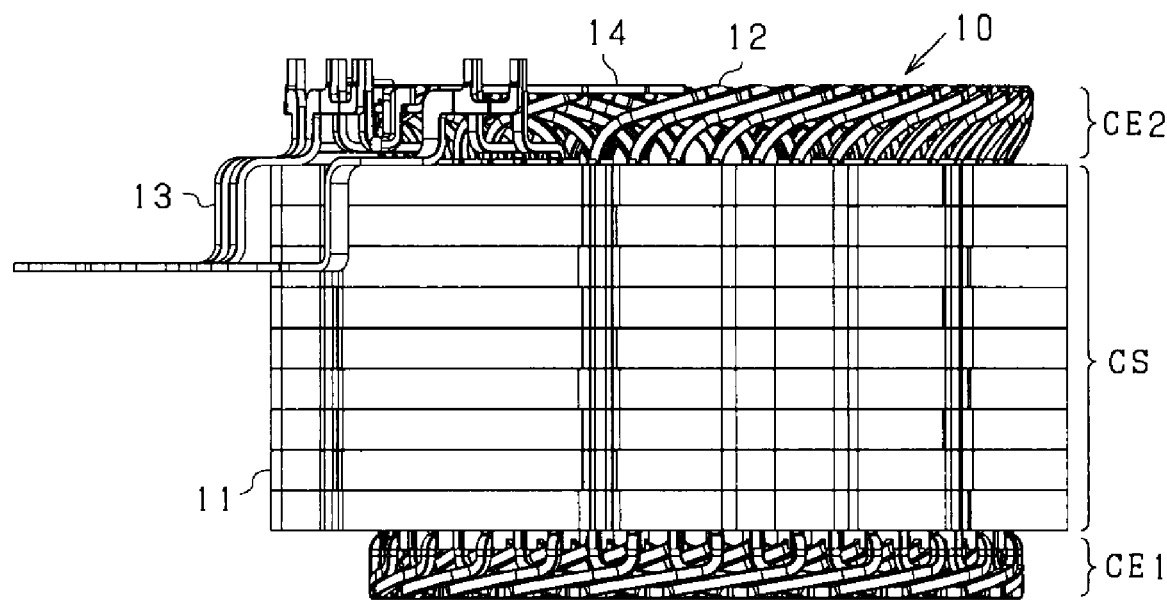
FIG. 2 is a side view of the stator.

FIGS. 1 and 2 show the overall configuration of a stator 10 according to the exemplary embodiment.

The stator 10 is designed to be used in a rotating electric machine, more particularly in a three-phase electric motor for a vehicle or an aircraft. Moreover, the electric motor may be configured as a permanent magnet synchronous motor, a field coil motor or an induction motor.

Although not shown in the figures, the rotating electric machine further includes, in addition to the stator 10 that has a hollow cylindrical shape, a rotor arranged radially inside the stator 10. More specifically, the rotor is arranged so as to be rotatable about a rotation axis relative to the stator 10.

Hereinafter, the axial direction of the stator 10, which coincides with the direction of the rotation axis of the rotor, will be simply referred to as the axial direction; the radial directions of the stator 10, which coincide with the directions of extending radially from the rotation axis of the rotor, will be simply referred to as the radial directions; and the circumferential direction of the stator 10, which coincides with the direction of extending along a circle whose center is on the rotation axis of the rotor, will be simply referred to as the circumferential direction.

As shown in FIGS. 1 and 2, the stator 10 includes an annular stator core 11 and a stator coil 12 wound on the stator core 11. As mentioned above, in the present embodiment, the rotor (not shown in the figures) is rotatably arranged radially inside the stator 10. That is, the rotating electric machine, in which the stator 10 is employed, is an inner rotor type rotating electric machine.

The stator coil 12 is a three-phase coil which includes a U-phase winding, a V-phase winding and a W-phase winding. The U-phase, V-phase and W-phase windings are Y-connected (i.e., star-connected) to define a neutral point therebetween.

Moreover, the stator 10 also includes three electric power input/output busbars 13 and a neutral busbar 14. Each of the U-phase, V-phase and W-phase windings of the stator coil 12 has a first end connected to a corresponding one of the three electric power input/output busbars 13 and a second end connected to the neutral busbar 14.

In addition, as shown in FIG. 2, the stator coil 12 as a whole has a coil main part CS located in the same axial range as the stator core 11 and a pair of first and second coil end parts CE1 and CE2 located respectively on opposite axial sides of the stator core 11.

Figure 3:
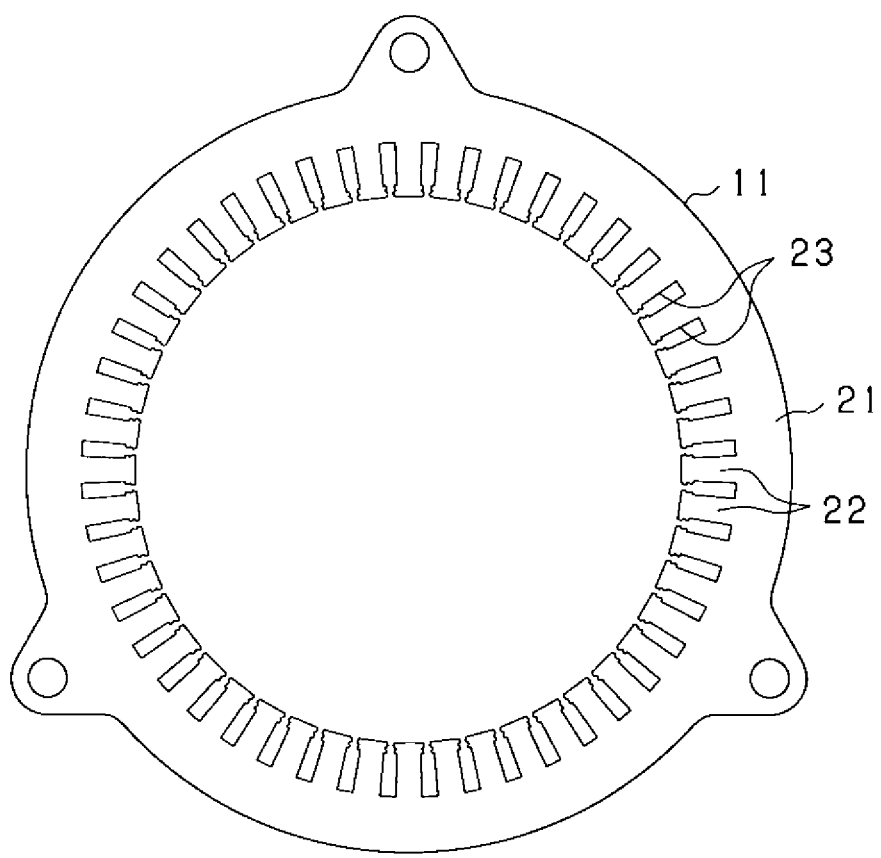
FIG. 3 is a plan view of a stator core of the stator.

As shown in FIG. 3, the stator core 11 includes an annular back yoke 21, a plurality of teeth 22 and a plurality of slots 23. The teeth 22 each protrude radially inward from the back yoke 21 and are arranged at predetermined intervals in the circumferential direction. Each of the slots 23 is formed between a circumferentially-adjacent pair of the teeth 22. Moreover, each of the slots 23 is formed as an opening that axially penetrates the stator core 11 and is longer in a radial direction than in the circumferential direction. Furthermore, the slots 23 are formed at equal intervals in the circumferential direction in the stator core 11. The stator coil 12 is wound on the stator core 11 so as to be received in the slots 23. In the present embodiment, the stator core 11 is constituted of a core sheet laminate that is obtained by laminating a plurality of core sheets in the axial direction; the core sheets are formed of a magnetic material such as magnetic steel.

Although not shown in the figures, the stator coil 12 is supplied with three-phase AC power from an inverter that converts DC power from an electric power supply into the three-phase AC power. With supply of the three-phase AC power to the stator coil 12, magnetic flux is generated by the stator 10.

In the present embodiment, the stator coil 12 is formed of a plurality of substantially U-shaped electrical conductor segments 30. The electrical conductor segments 30 correspond to electrical conductor wires forming the stator coil 12. Hereinafter, the segment structure of the stator coil 12 will be described in detail.

Figure 4:
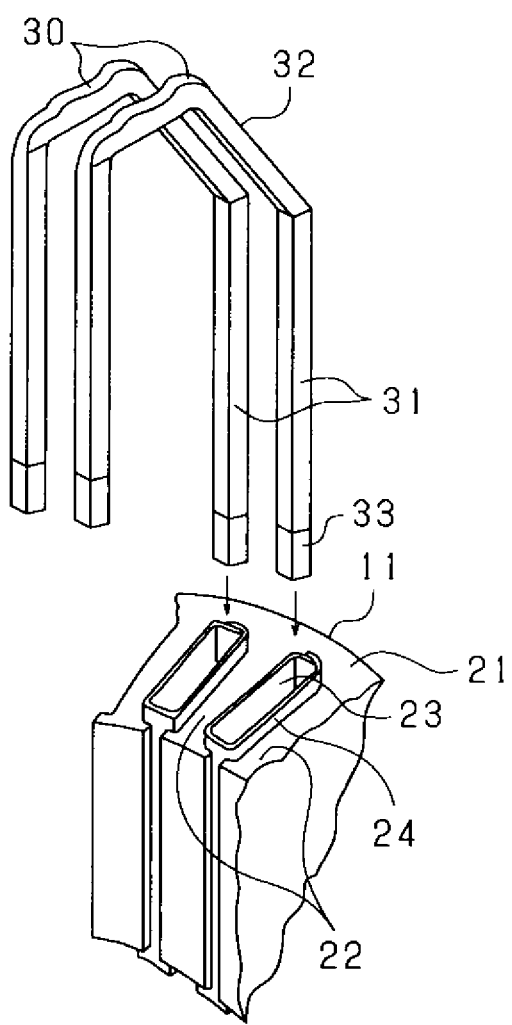
FIG. 4 is a perspective view illustrating the insertion of electrical conductor segments, which together form a stator coil of the stator, into slots of the stator core.

As shown in FIG. 4, each of the electrical conductor segments 30 is substantially U-shaped to have a pair of straight portions 31 and a turn portion 32. The pair of straight portions 31 extend straight in parallel to each other. The turn portion 32 is bent so as to connect the pair of straight portions 31. Moreover, the pair of straight portions 31 have a length greater than the axial length of the stator core 11. In the present embodiment, the electrical conductor segments 30 are formed of a flat electrical conductor wire that includes an electrical conductor having a substantially rectangular cross section (i.e., having two pairs of opposing side surfaces) and an insulating coat covering the electrical conductor. Each of the straight portions 31 of the electrical conductor segments 30 has a distal end portion from which the insulating coat is removed; thus the distal end portion constitutes an exposed portion 33 where the electrical conductor is exposed from the insulating coat.

In each of the slots 23 of the stator core 11, the electrical conductor segments 30 are inserted so as to be radially aligned in a row. More particularly, in the present embodiment, in each of the slots 23, the straight portions 31 of the electrical conductor segments 30 are radially stacked in four layers. Moreover, for each of the electrical conductor segments 30, the pair of straight portions 31 of the electrical conductor segment 30 are respectively received in corresponding two slots 23 of the stator core 11 which are located away from each other by a predetermined coil pitch. Those parts of the straight portions 31 of the electrical conductor segments 30 which are received in the corresponding slots 23 of the stator core 11 together constitute the coil main part CS of the stator coil 12. Furthermore, in each of the slots 23, there is provided an insulating sheet 24 (see FIG. 4) to electrically insulate between the stator core 11 and the stator coil 12 (i.e., the electrical conductor segments 30). Specifically, the insulating sheet 24 is bent so as to surround all of the straight portions 31 of the electrical conductor segments 30 inserted in the slot 23. That is, the insulating sheet 24 is interposed between an interior wall surface of the stator core 11 which defines the slot 23 and the straight portions 31 of the electrical conductor segments 30 inserted in the slot 23.

In the present embodiment, for each of the electrical conductor segments 30, the pair of straight portions 31 of the electrical conductor segment 30 are respectively received in the corresponding two slots 23 of the stator core 11 so as to be offset in radial position from each other by one layer. For example, one of the pair of straight portions 31 is located at the nth layer counting from the radially outer side (i.e., from the back yoke 21 side) while the other of the pair of straight portions 31 is located at the (n+1)th layer counting from the radially outer side.

In assembling the electrical conductor segments 30 (i.e., the stator coil 12) to the stator core 11, the straight portions 31 of the electrical conductor segments 30 are inserted into the corresponding slots 23 of the stator core 11 from a first axial side (i.e., the lower side in FIGS. 1 and 2) of the stator core 11 so that parts of the straight portions 31 protrude out of the corresponding slots 23 to a second axial side (i.e., the upper side in FIGS. 1 and 2) of the stator core 11. Then, the protruding parts (i.e., the anti-turn-portion-side parts) of the straight portions 31 are bent in the circumferential direction. Thereafter, each corresponding pair of the protruding parts of the straight portions 31, which respectively belong to two different electrical conductor segments 30, are joined together at the exposed portions 33 thereof. Consequently, on the first axial side of the stator core 11, all the turn portions 32 of the electrical conductor segments 30 together constitute the first coil end part CE1 of the stator coil 12; on the second axial side of the stator core 11, all the protruding parts of the straight portions 31 of the electrical conductor segments 30 together constitute the second coil end part CE2 of the stator coil 12 (see FIG. 2). The outlines of the first and second coil end parts CE1 and CE2 are illustrated in FIG. 2.

Next, the connection between the electrical conductor segments 30 at the second coil end part CE2 of the stator coil 12 will be described in more detail.

Figure 5:
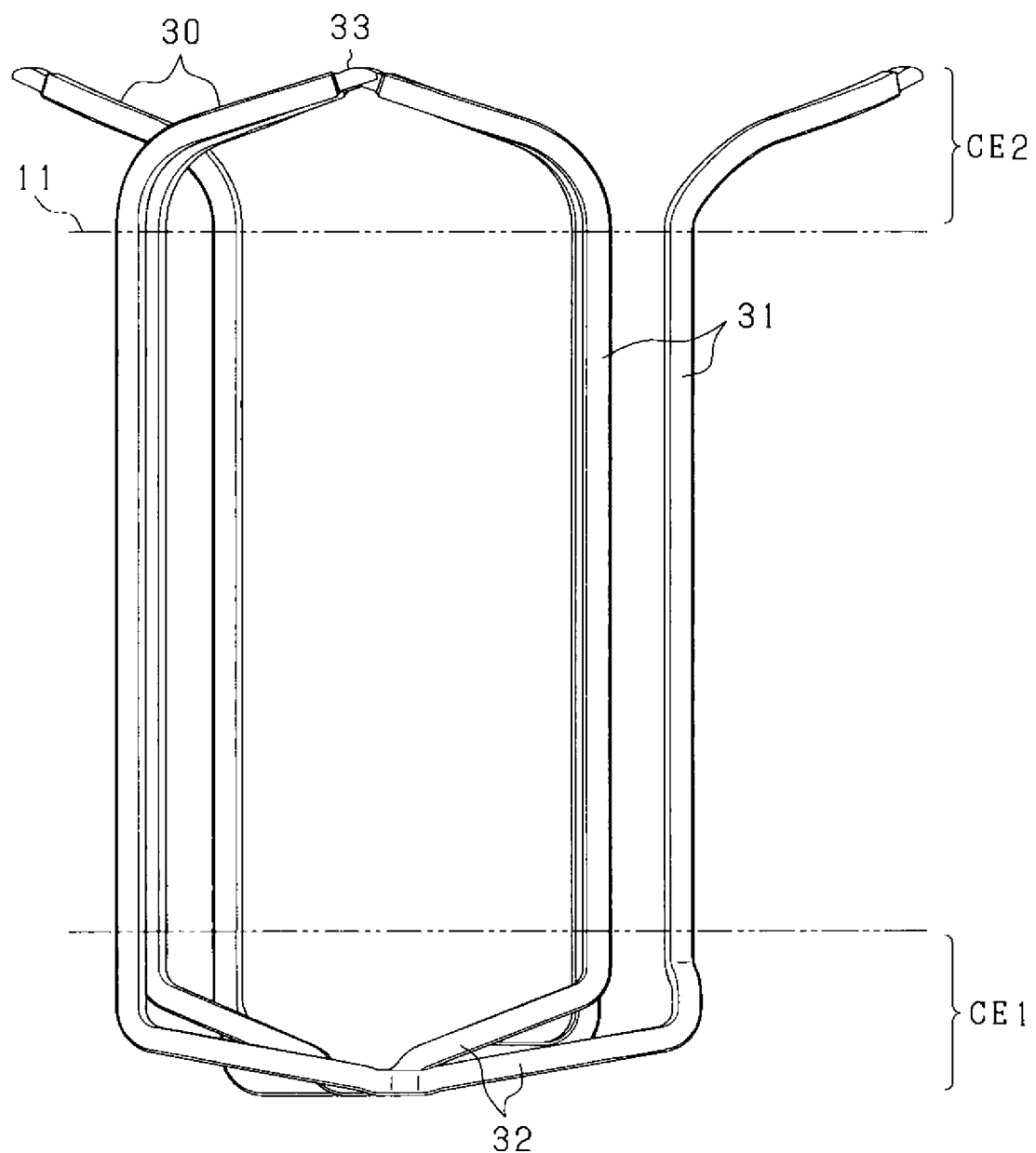
FIG. 5 is an explanatory diagram illustrating the electrical conductor segments received in the slots of the stator core.

FIG. 5 shows some of the electrical conductor segments 30 received in the corresponding slots 23 of the stator core 11. It should be noted that in FIG. 5, the stator core 11 is represented by imaginary lines (i.e., two-dot chain lines). In each of the electrical conductor segments 30, the anti-turn-portion-side parts of the pair of straight portions 31 protrude from an axial end face (i.e., the upper end face in FIG. 5) of the stator core 11 and are bent in the circumferential direction so as to extend obliquely with a predetermined angle with respect to the axial end face of the stator core 11. Moreover, each corresponding pair of the exposed portions 33 of the electrical conductor segments 30 are joined together by laser welding, so that the electrical conductor segments 30 are connected to one another.

At the second coil end part CE2 of the stator coil 12, each of those anti-turn-portion-side parts of the straight portions 31 of the electrical conductor segments 30 which extend to one side in the circumferential direction is joined to a corresponding one of those anti-turn-portion-side parts of the straight portions 31 of the electrical conductor segments 30 which extend to the other side in the circumferential direction. Consequently, at the second coil end part CE2, the stator coil 12 has the straight portions 31 of the electrical conductor segments 30 extending obliquely with respect to the axial direction and turned back at predetermined top positions. In addition, the anti-turn-portion-side parts of the straight portions 31 of the electrical conductor segments 30 include both those anti-turn-portion-side parts which are bent to the same side as the corresponding turn portions 32 in the circumferential direction and those anti-turn-portion-side parts which are bent to the opposite side to the corresponding turn portions 32 in the circumferential direction.

Next, the laser welding between the electrical conductor segments 30 will be described with reference to FIGS. 6A, 6B and 6C.

Figure 6A:
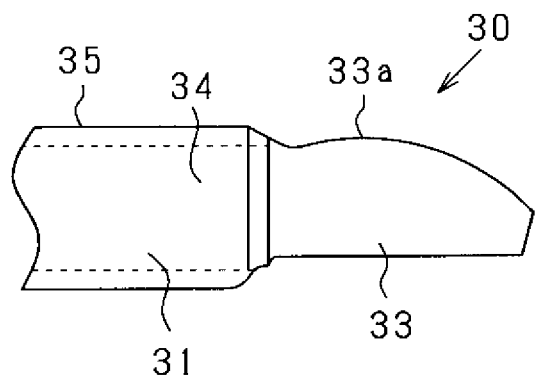
FIGS. 6A, 6B and 6C are explanatory diagrams illustrating the laser welding between each corresponding pair of exposed portions of the electrical conductor segments according to the exemplary embodiment.

FIG. 6A shows a distal end portion of one of the electrical conductor segments 30 through enlargement. FIG. 6B shows a pair of distal end portions of the electrical conductor segments 30 in a state of having been placed in contact with each other. FIG. 6C shows the pair of distal end portions of the electrical conductor segments 30 in a state of having been laser-welded to each other. It should be noted that in FIGS. 6B and 6C, the left-right direction coincides with the circumferential direction and the vertical direction coincides with the axial direction.

As shown in FIG. 6A, in the present embodiment, each of the electrical conductor segments 30 includes a wire-shaped electrical conductor 34 and an insulating coat 35 covering the electrical conductor 34. As described above, each of the straight portions 31 of the electrical conductor segments 30 has a distal end portion from which the insulating coat 35 is removed; thus the distal end portion constitutes an exposed portion 33 where the electrical conductor 34 is exposed from the insulating coat 35. Moreover, in each of the electrical conductor segments 30, the other portions of the electrical conductor segment 30 than the exposed portions 33 constitute a covered portion 36 where the electrical conductor 34 is covered with the insulating coat 35. Furthermore, in each of the exposed portions 33, an axially outer surface 33a (i.e., upper surface in the figure) of the exposed portion 33 is formed as an arc-shaped surface that is convex axially outward. On the other hand, other surfaces of the exposed portion 33 than the axially outer surface 33a, such as an axially inner surface, a radially outer surface and a radially inner surface, are each formed as a flat surface.

Figure 6B:
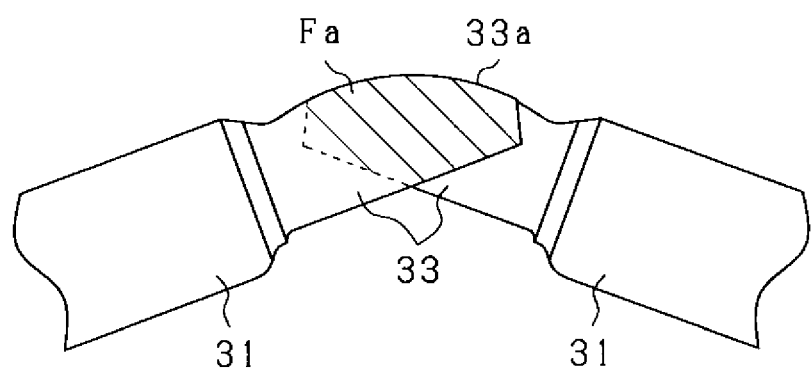

As shown in FIG. 6B, each corresponding pair of the exposed portions 33 of the electrical conductor segments 30 are radially overlapped with each other and thus brought into an overlapped state. As described above, each of the exposed portions 33 of the electrical conductor segments 30 has its axially outer surface 33a formed as an arc-shaped surface that is convex axially outward. Each corresponding pair of the exposed portions 33 of the electrical conductor segments 30 are overlapped with each other in the thickness direction thereof so that: (i) the axially outer surfaces 33a thereof are substantially flush with each other; and (ii) the central axes of the arcs of the axially outer surfaces 33a coincide with each other (i.e., the arc-shaped axially outer surfaces 33a are coaxial with each other). The radius of the arc (or the radius of curvature) of each of the axially outer surfaces 33a of the exposed portions 33 may be set to be greater than the width of the electrical conductor segments 30. Moreover, for each corresponding pair of the exposed portions 33 of the electrical conductor segments 30, an overlap part Fa (i.e., the hatched area in the figure) between the pair of the exposed portions 33 is formed to be longer in the circumferential direction than in the axial direction. In the overlap part Fa, laser welding is performed by irradiating a laser beam onto the axially outer surfaces 33a of the exposed portions 33. In other words, the laser welding is performed by irradiating the laser beam from the anti-stator core side of the exposed portions 33 (i.e., the opposite side of the exposed portions 33 to the stator core 11) in the axial direction. In addition, during the laser welding, the laser beam is traversed along the arc-shaped axially outer surfaces 33a of the exposed portions 33 and within a predetermined circumferential range.

Figure 6C:
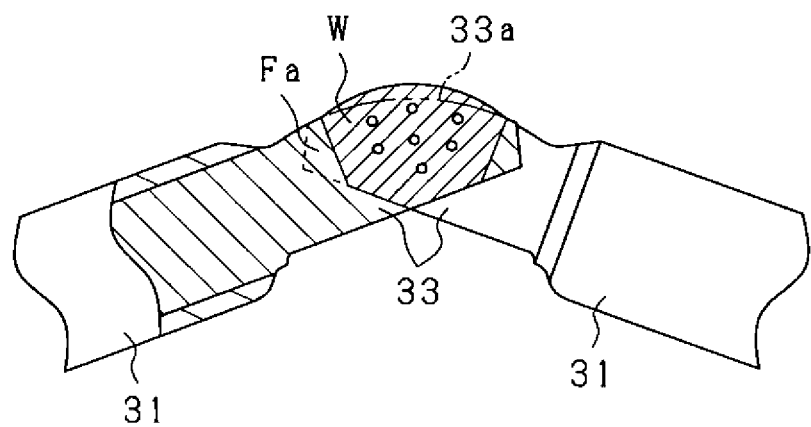

As shown in FIG. 6C, in the overlap part Fa between the exposed portions 33, the laser beam is irradiated from the axially outer side (i.e., the upper side in the figure) onto the axially outer surfaces 33a of the exposed portions 33. Consequently, the electrical conductors 34 of the exposed portions 33 are melted together to form a weld W between the exposed portions 33. In the present embodiment, voids remain in the weld W due to metal vapor generated during the laser welding. Specifically, voids are formed in the weld W by adjusting the welding conditions such as the laser output, the laser spot diameter and the laser traversing speed. As a result, the surface of the weld W bulges out, increasing the surface area of the weld W (in other words, increasing the heat dissipation area of the exposed portions 33).

Figure 7:
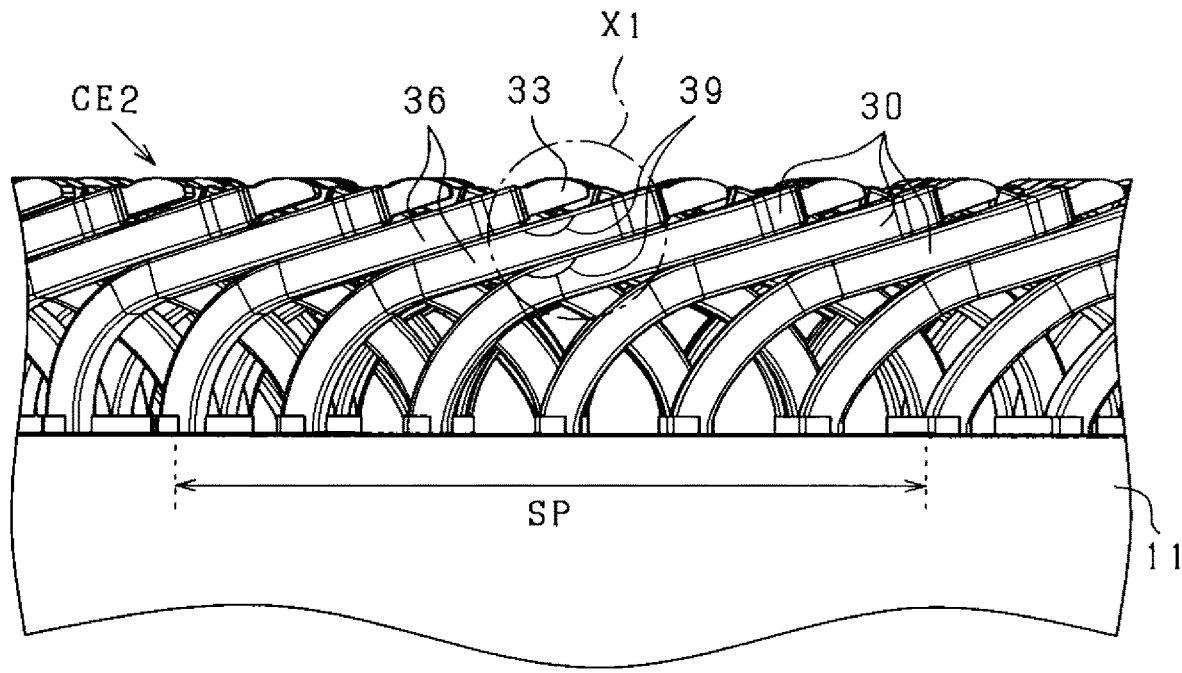
FIG. 7 is an explanatory diagram illustrating the arrangement of the electrical conductor segments at a coil end part of the stator coil.

FIG. 7 illustrates the arrangement of the electrical conductor segments 30 at the second coil end part CE2. As shown in FIG. 7, the electrical conductor segments 30 are welded to one another so as to connect each corresponding pair of in-slot portions of the electrical conductor segments 30 which are located away from each other by a predetermined slot pitch SP. At the second coil end part CE2, the electrical conductor segments 30 are arranged so as to axially overlap one another. In the present embodiment, the exposed portions 33 of the electrical conductor segments 30 are located axially outermost; on the axially inner side (i.e., the stator core side) of the exposed portions 33, the covered portions 36 of the electrical conductor segments 30 are arranged in two layers. More specifically, as shown in FIG. 8, at the second coil end part CE2, the exposed portion 33 of a first electrical conductor segment 30, the covered portion 36 of a second electrical conductor segment 30 and the covered portion 36 of a third electrical conductor segment 30 are arranged in axial alignment with each other.

Moreover, in the present embodiment, in order to improve the performance of cooling the stator coil 12 at the second coil end part CE2, in the covered portion 36 of each of the electrical conductor segments 30, there is formed at least one coat-removed portion 39 where the insulating coat 35 is locally removed from the covered portion 36. Hereinafter, the coat-removed portions 39 of the electrical conductor segments 30 will be described in detail.

Figure 8:
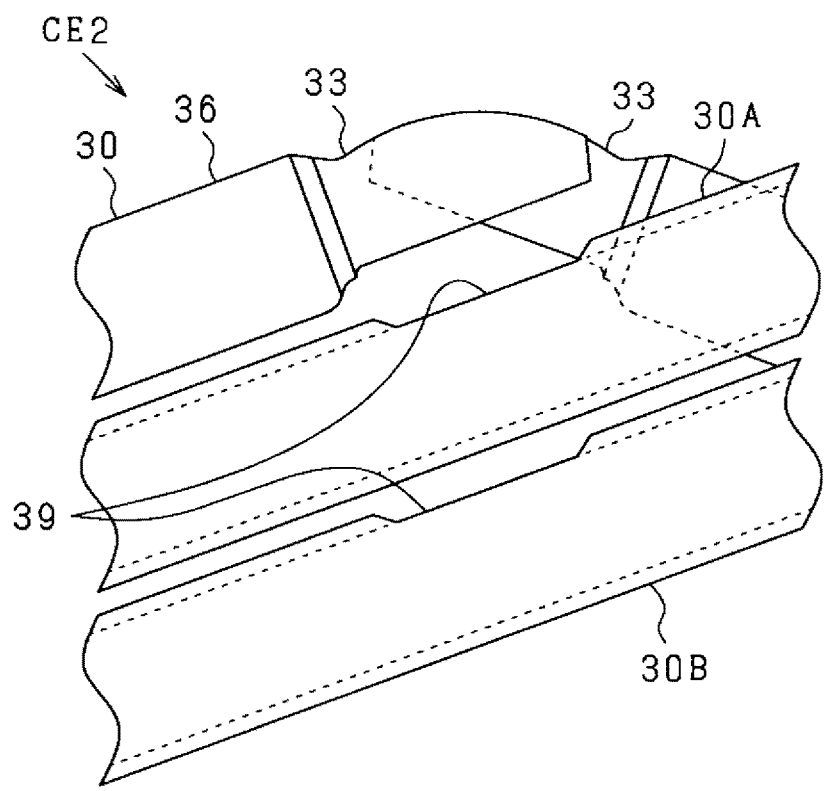
FIG. 8 is an enlarged view of a part X1 of FIG. 7.

FIG. 8 is an enlarged view of a part X1 of FIG. 7. As shown in FIG. 8, on the stator core side (i.e., the lower side in the figure) of the exposed portion 33 of the first electrical conductor segment 30 in the axial direction, there is arranged the covered portion 36 of the second electrical conductor segment 30. Further, on the stator core side of the covered portion 36 of the second electrical conductor segment 30 in the axial direction, there is arranged the covered portion 36 of the third electrical conductor segment 30. Hereinafter, for the sake of convenience of explanation, the second and third electrical conductor segments 30 will be respectively denoted by reference numerals 30A and 30B.

In the present embodiment, in each of the covered portions 36 of the second and third electrical conductor segments 30A and 30B, there is formed a coat-removed portion 39 on the opposite axial side to the stator core 11 and in axial alignment with the exposed portion 33 of the first electrical conductor segment 30.

Moreover, in the present embodiment, the coat-removed portions 39 are formed in the covered portions 36 of the electrical conductor segments 30 by utilizing heat generated during the laser welding of the exposed portions 33 of the electrical conductor segments 30. Specifically, as described above, at the second coil end part CE2, the electrical conductor segments 30 are arranged so as to overlap one another in the axial direction. The laser welding is performed by irradiating the laser beam to the exposed portions 33 from the anti-stator core side (i.e., the laser irradiation side) of the exposed portions 33 in the axial direction. During the laser welding, the laser beam penetrates the exposed portions 33 of the electrical conductor segments 30 to reach the second and third electrical conductor segments 30A and 30B on the stator core side (i.e., the anti-laser irradiation side) of the exposed portions 33. Consequently, the insulating coats 35 of the second and third electrical conductor segments 30A and 30B are locally removed by heat of the laser beam.

Figure 9:
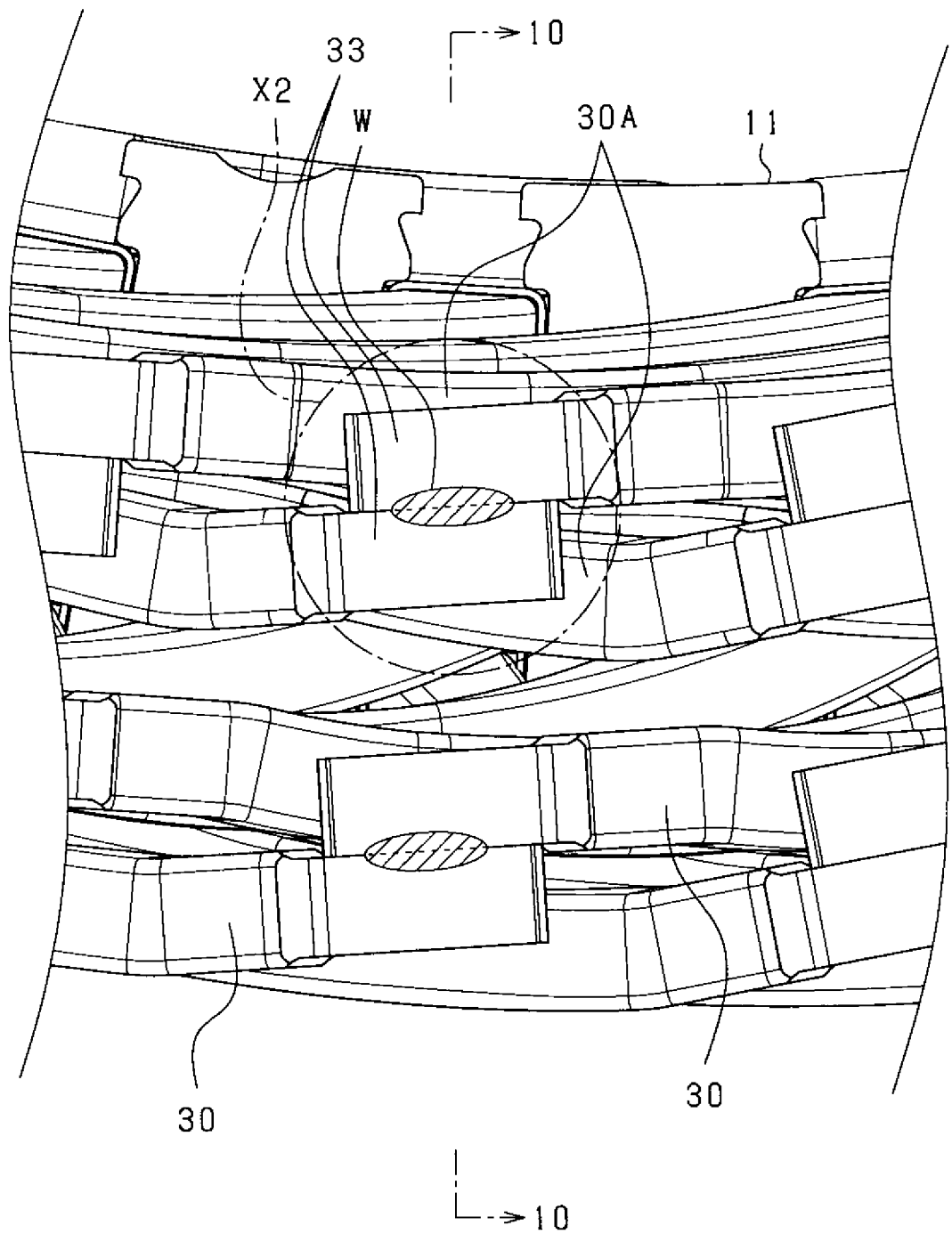
FIG. 9 is a plan view, along an axial direction of the stator, of part of the coil end part.
Figure 10:
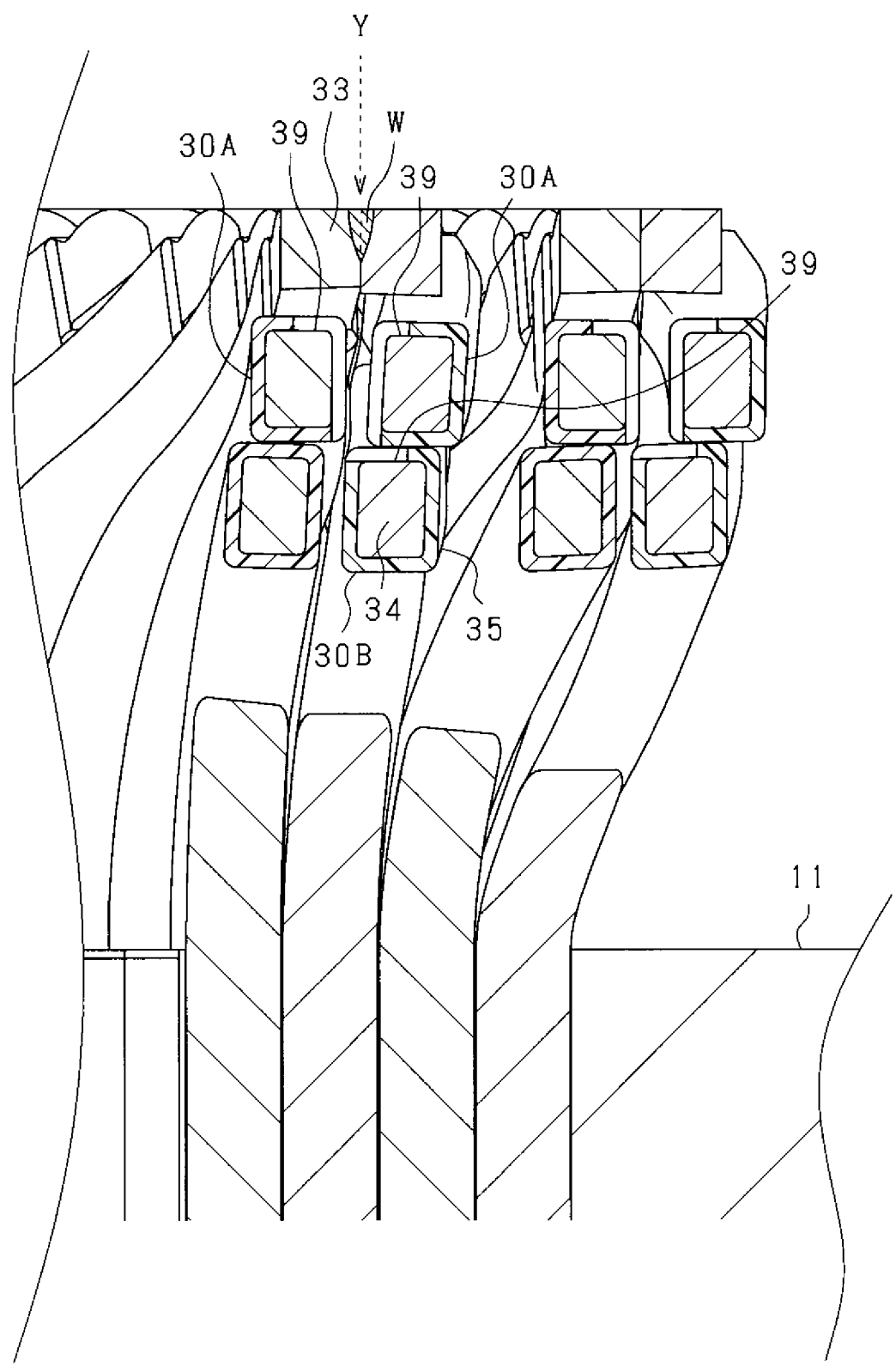
FIG. 10 is a longitudinal cross-sectional view, taken along the line 10-10 in FIG. 9, of the coil end part.

FIG. 9 is a plan view, along the axial direction, of part of the second coil end part CE2. FIG. 10 is a longitudinal cross-sectional view, taken along the line 10-10 in FIG. 9, of the second coil end part CE2. In addition, the arrow Y in FIG. 10 indicates the laser irradiation direction. Hereinafter, explanation will be given of the arrangement of the electrical conductor segments 30 and the formation of the coat-removed portions 39 of the second and third electrical conductor segments 30A and 30B in a part X2 of FIG. 9.

As shown in FIGS. 9 and 10, in the overlap part Fa between the exposed portions 33 of a pair of first electrical conductor segments 30, there is formed a weld W along the circumferentially-extending boundary between the exposed portions 33. Moreover, on the stator core side (i.e., the lower side in FIG. 10) of the weld W in the laser irradiation direction Y (i.e., the axially inward direction), there are arranged a pair of second electrical conductor segments 30A respectively on opposite radial sides of the boundary between the exposed portions 33. Furthermore, on the stator core side of the pair of second electrical conductor segments 30A in the laser irradiation direction Y, there is arranged a third electrical conductor segment 30B so as to overlap, in the laser irradiation direction Y, the boundary between the exposed portions 33.

With the above arrangement, when the laser beam is irradiated in the laser irradiation direction Y, it penetrates the exposed portions 33 of the pair of first electrical conductor segments 30 to reach the second and third electrical conductor segments 30A and 30B on the stator core side of the exposed portions 33. Consequently, the insulating coats 35 of the second and third electrical conductor segments 30A and 30B are locally removed by heat of the laser beam. As a result, in the pair of second electrical conductor segments 30A, the coat-removed portions 39 are formed in opposing surfaces of the pair of second electrical conductor segments 30A as well as in axially-outer side surfaces of the pair of second electrical conductor segments 30A. In addition, the opposing surfaces of the pair of second electrical conductor segments 30A are radially opposed to each other; and the axially-outer side surfaces of the pair of second electrical conductor segments 30A face the exposed portions 33 in the laser irradiation direction Y (i.e., in the axial direction). On the other hand, in the third electrical conductor segment 30B, the coat-removed portion 39 is formed in only an axially-outer side surface of the third electrical conductor segment 30B which faces the exposed portions 33 in the laser irradiation direction Y.

In addition, in the overlap part Fa between the exposed portions 33 of the pair of first electrical conductor segments 30, the weld W may be formed over the entire axial range from the laser irradiation side to the anti-laser irradiation side of the exposed portions 33. In this case, on the surfaces of the exposed portions 33 on the stator core side (i.e., the anti-laser irradiation side), there remain laser-beam penetration vestiges that indicate occurrence of the penetration of the laser beam through the exposed portions 33.

Moreover, at edges of the insulating coats 35 of the second and third electrical conductor segments 30A and 30B around the respective coat-removed portions 39, there remain melting vestiges that indicate occurrence of the melting of the insulating coats 35 due to heat of the laser beam and the solidification of the same after the melting. The melting vestiges are formed so as to surround the respective coat-removed portions 39. Consequently, although the coat-removed portions 39 are formed locally in the covered portions 36 of the second and third electrical conductor segments 30A and 30B, with the melting vestiges, it becomes difficult for unintended peeling of the insulating coats 35 to occur from the coat-removed portions 39.

Next, a method of manufacturing the stator 10 according to the present embodiment will be described. The method mainly includes an assembly step of assembling the electrical conductor segments 30 to the stator core 11, and a welding step of laser-welding each corresponding pair of the exposed portions 33 of the electrical conductor segments 30 by irradiating a laser beam to the overlap part Fa between the pair of the exposed portions 33.

Specifically, in the assembly step, the straight portions 31 of the electrical conductor segments 30 are inserted into the corresponding slots 23 of the stator core 11 from the first axial side of the stator core 11 so that parts of the straight portions 31 protrude out of the corresponding slots 23 to the second axial side of the stator core 11. Then, on the second axial side of the stator core 11, the protruding parts of the straight portions 31 are bent in the circumferential direction so that each corresponding pair of the exposed portions 33 of the electrical conductor segments 30 are brought into a radially overlapped state.

In the welding step, each corresponding pair of the exposed portions 33 of the electrical conductor segments 30 are laser-welded to each other by irradiating the laser beam to the overlap part Fa between the pair of the exposed portions 33. More specifically, the laser welding is performed by traversing the laser beam along the overlap part Fa between the pair of the exposed portions 33. During the laser welding, the laser beam penetrates the pair of the exposed portions 33 to reach the second and third electrical conductor segments 30A and 30B on the stator core side (i.e., the anti-laser irradiation side) of the pair of the exposed portions 33. Consequently, the insulating coats 35 of the second and third electrical conductor segments 30A and 30B are locally removed by heat of the laser beam. As a result, as shown in FIG. 10, in the pair of second electrical conductor segments 30A that are arranged respectively on opposite radial sides of the boundary between the pair of the exposed portions 33, the coat-removed portions 39 are formed in the opposing surfaces of the pair of second electrical conductor segments 30A which are radially opposed to each other as well as in the axially-outer side surfaces of the pair of second electrical conductor segments 30A which face the pair of the exposed portions 33 in the laser irradiation direction Y. On the other hand, in the third electrical conductor segment 30B that is arranged so as to overlap the boundary between the pair of the exposed portions 33 in the laser irradiation direction Y, the coat-removed portion 39 is formed in only the axially-outer side surface of the third electrical conductor segment 30B which faces the pair of the exposed portions 33 in the laser irradiation direction Y. In addition, in performing the laser welding, the laser output may be adjusted so as to enable the laser beam to penetrate the pair of the exposed portions 33.

Moreover, in the welding step, the laser traversing range, within which the laser beam is traversed to weld the pair of the exposed portions 33, may be set to be equal to the overlap range in which the pair of the exposed portions 33 are radially overlapped with each other.

Figure 11:
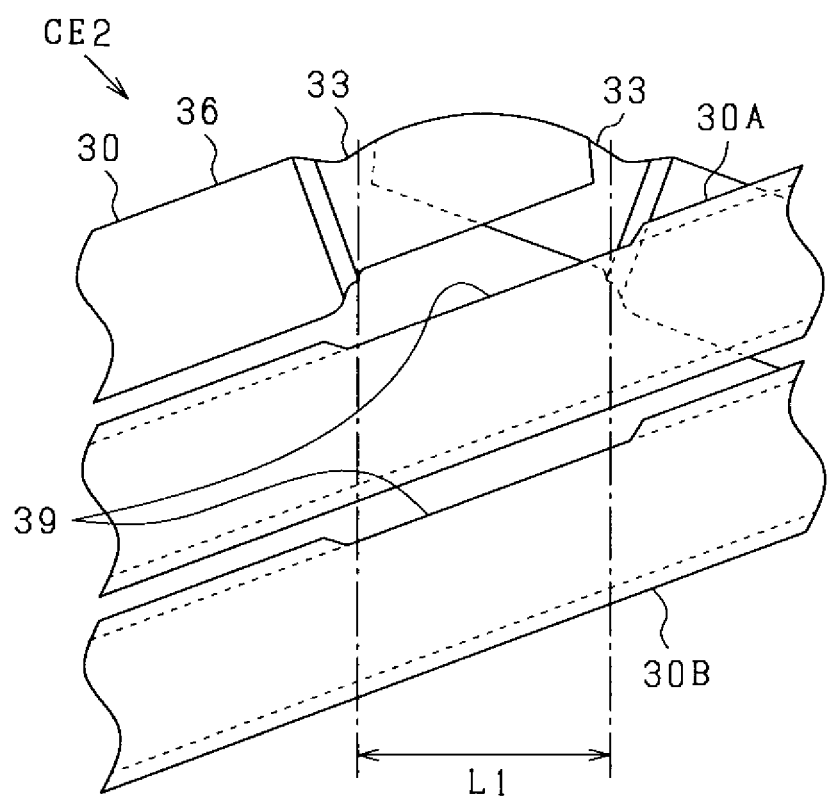
FIG. 11 is an explanatory diagram illustrating a laser traversing range L1 in which a laser beam is traversed to weld each corresponding pair of the exposed portions of the electrical conductor segments.

Otherwise, as shown in FIG. 11, the laser traversing range L1 may be set to be wider than the overlap range. In this case, it is possible to form the coat-removed portions 39 in a wider range in the longitudinal direction of the electrical conductor segments 30 than the overlap range (or the range of the overlap part Fa). More specifically, in this case, the laser traversing range protrudes from the overlap part Fa between the pair of the exposed portions 33; and the penetration of the laser beam through either of the pair of the exposed portions 33 occurs in the protruding parts of the laser traversing range from the overlap part Fa. Consequently, the coat-removed portions 39 can be formed in the covered portions 36 of the electrical conductor segments 30 in a wider range than the overlap range.

Figure 12:
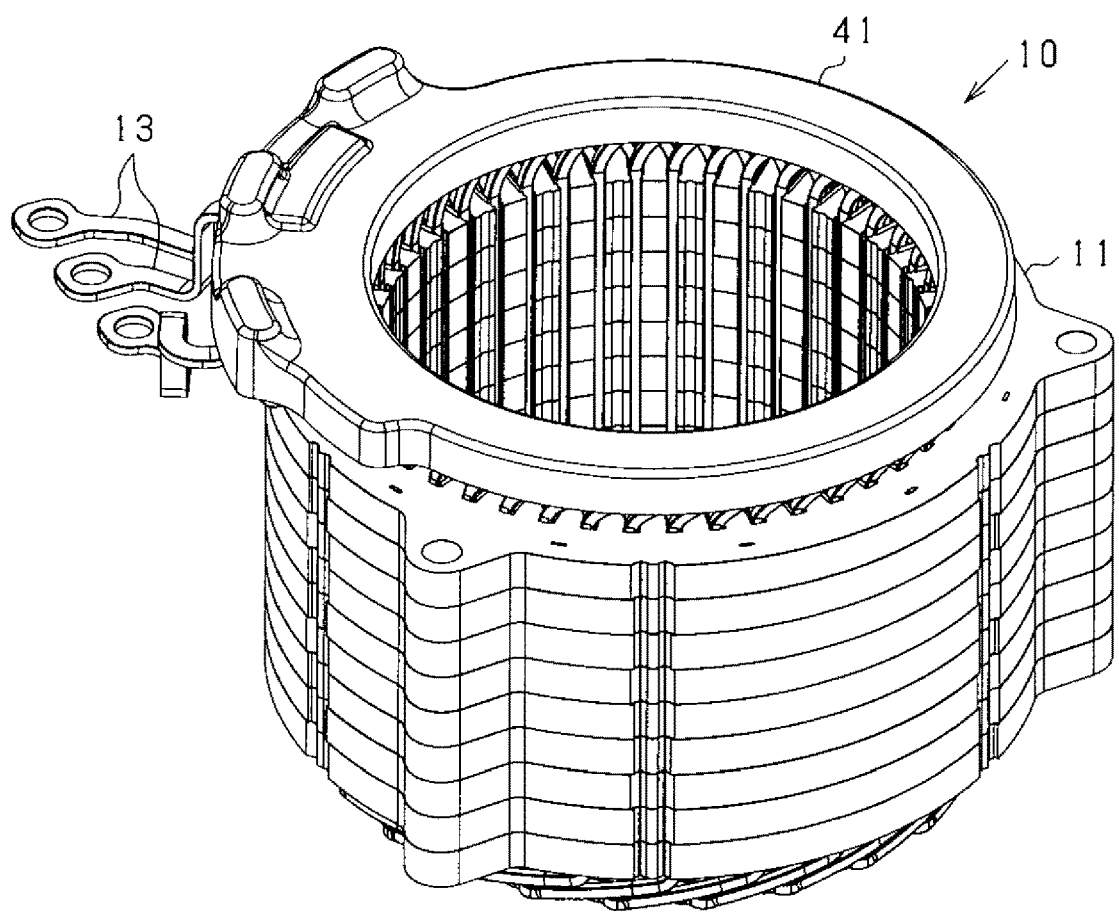
FIG. 12 is a perspective view showing a resin encapsulating member having the coil end part encapsulated therein.
Figure 13:
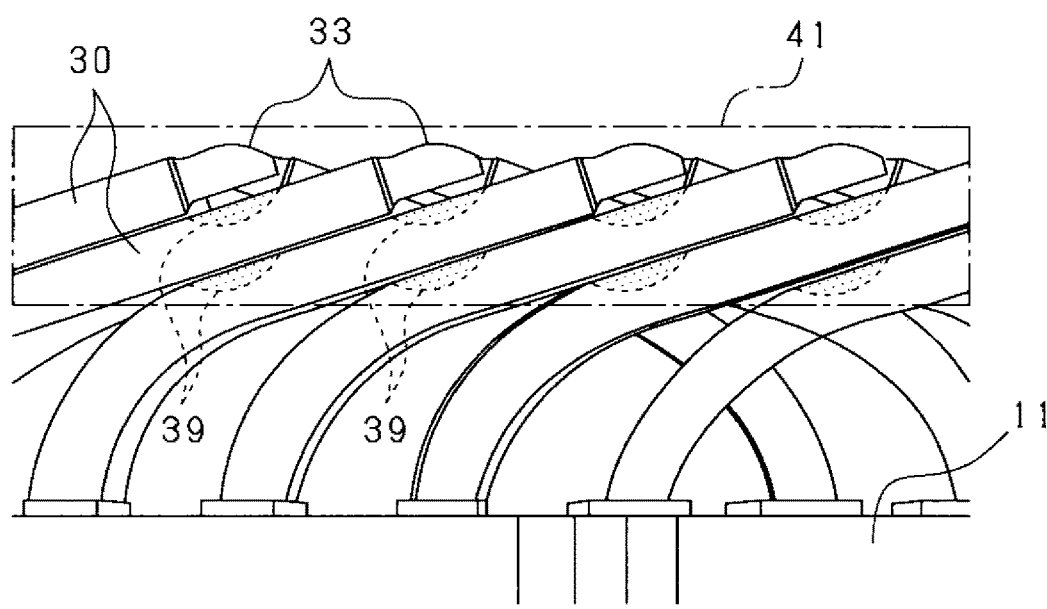
FIG. 13 is a side view showing part of the resin encapsulating member.

Furthermore, in the present embodiment, after the welding step, the second coil end part CE2 of the stator coil 12 is encapsulated by an electrically insulative resin having a higher thermal conductivity than the insulating coats 35 of the electrical conductor segments 30. Consequently, as shown in FIGS. 12 and 13, at the second coil end part CE2, there is formed an annular resin encapsulating member 41 to encapsulate, at least, the exposed portions 33 and the coat-removed portions 39 of the electrical conductor segments 30 therein.

More particularly, in the present embodiment, the resin encapsulating member 41 is formed within an axial range covering only part of the second coil end part CE2. Specifically, the axial range of the resin encapsulating member 41 covers the exposed portions 33 and the coat-removed portions 39 of the electrical conductor segments 30 and is apart from the axial end face of the stator core 11 on the second axial side of the stator core 11. That is, between the resin encapsulating member 41 and the axial end face of the stator core 11, there remains a region that is not occupied by the resin encapsulating member 41. This region can be utilized as a cooling region for cooling the stator coil 12. In addition, the stator coil 12 can be cooled by a coolant such as cooling oil, cooling water or air.

According to the present embodiment, it is possible to achieve the following advantageous effects.

In the present embodiment, the stator 10 includes the annular stator core 11 and the stator coil 12 provided on the stator core 11. The stator coil 12 is formed of the electrical conductor segments 30 (corresponding to electrical conductor wires) each including the electrical conductor 34 and the insulating coat 35 covering the electrical conductor 34. Each of the electrical conductor segments 30 has the pair of exposed portions 33 where the electrical conductor 34 is exposed from the insulating coat 35 and the covered portion 36 where the electrical conductor 34 is covered with the insulating coat 35. The pair of exposed portions 33 are formed respectively at opposite end portions of the electrical conductor segment 30 (i.e., the distal end portions of the pair of straight portions 31 of the electrical conductor segment 30). The covered portion 36 is formed at the other portions of the electrical conductor segment 30 than the end portions. The stator coil 12 has the second coil end part CE2 protruding from the axial end face of the stator core 11 on the second axial side of the stator core 11. At the second coil end part CE2, each corresponding pair of the exposed portions 33 of the electrical conductor segments 30 are welded together and each of the covered portions 36 of the electrical conductor segments 30 has formed therein at least one coat-removed portion 39 where the insulating coat 35 is locally removed from the covered portion 36 (see FIG. 7).

With the above configuration, at the second coil end part CE2 of the stator coil 12, the electrical conductor 34 is exposed from the insulating coat 35 at the exposed portions 33 (i.e., the end portions) of the electrical conductor segments 30, but covered with the insulating coat 35 at the covered portions 36 (i.e., the other portions) of the electrical conductor segments 30. Therefore, heat dissipation of the electrical conductor segments 30 may be limited. In this regard, according to the present embodiment, at the second coil end part CE2, each of the covered portions 36 of the electrical conductor segments 30 has formed therein at least one coat-removed portion 39 where the insulating coat 35 is locally removed from the covered portion 36. Consequently, it becomes possible to improve the heat dissipation performance of the electrical conductor segments 30. As a result, it becomes possible to improve the cooling performance at the second coil end part CE2, thereby suitably suppressing increase in the temperature of the stator 10.

In the present embodiment, at the second coil end part CE2, the electrical conductor segments 30 are arranged to overlap one another in the axial direction of the stator core 10 (more specifically, the axial direction of the annular stator core 11). In each of the covered portions 36 of the electrical conductor segments 30, the coat-removed portion 39 is formed on the opposite side of the covered portion 36 to the stator core 11 in the axial direction (see FIGS. 7 and 8).

With the above configuration, at the second coil end part CE2 of the stator coil 12, the electrical conductor segments 30, each of which constitutes a heat source, are arranged to overlap one another in the axial direction. Therefore, for each of the covered portions 36 of the electrical conductor segments 30, the ambient temperature on the stator core side of the covered portion 36 is higher than that on the opposite side of the covered portion 36 to the stator core 11 in the axial direction. In consideration of the above, in each of the covered portions 36 of the electrical conductor segments 30, the coat-removed portion 39 is formed on the opposite side of the covered portion 36 to the stator core 11 in the axial direction. Consequently, it becomes possible to dissipate heat of the electrical conductor segments 30 through the respective coat-removed portions 39 thereof on the opposite side to the stator core 11 where the ambient temperature is relatively low. As a result, it becomes possible to further improve the heat dissipation performance of the electrical conductor segments 30.

In the present embodiment, at the second coil end part CE2, there is provided the resin encapsulating member 41 that is formed of the electrically insulative resin having a higher thermal conductivity than the insulating coats 35 of the electrical conductor segments 30. In the resin encapsulating member 41, there are encapsulated, at least, the exposed portions 33 and the coat-removed portions 39 of the electrical conductor segments 30 (see FIGS. 12 and 13).

With the above configuration, at the second coil end part CE2 of the stator coil 12, the exposed portions 33 and the coat-removed portions 39 of the electrical conductor segments 30 are encapsulated in the resin encapsulating member 41 that is formed of the electrically insulative resin having a higher thermal conductivity than the insulating coats 35 of the electrical conductor segments 30. Consequently, it becomes possible to dissipate heat of the electrical conductor segments 30 through the respective coat-removed portions 39 thereof and via the resin encapsulating member 41 while ensuring electrical insulation between the electrical conductor segments 30. As a result, it becomes possible to improve the heat dissipation performance of the electrical conductor segments 30 while ensuring electrical insulation between the electrical conductor segments 30.

In the present embodiment, at the second coil end part CE2, each corresponding pair of the exposed portions 33 of the electrical conductor segments 30 are laser-welded together by irradiating the laser beam to the exposed portions 33 from the opposite side of the exposed portions 33 to the stator core 11 in the axial direction. The electrical conductor segments 30 forming the stator coil 12 include a pair of first electrical conductor segments 30 whose exposed portions 33 are laser-welded together, and at least one electrical conductor segment 30 (more particularly, the second and third electrical conductor segments 30A and 30B in the present embodiment) different from the pair of first electrical conductor segments 30 and arranged on the stator core side of the exposed portions 33 of the pair of first electrical conductor segments 30 in the axial direction. In the at least one electrical conductor segment 30 different from the pair of first electrical conductor segments 30, the coat-removed portion 39 is formed to be adjacent to the exposed portions 33 of the pair of first electrical conductor segments 30 in the axial direction (see FIGS. 8 and 10).

With the above configuration, during the laser welding of the exposed portions 33 of the pair of first electrical conductor segments 30, the laser beam penetrates the exposed portions 33 to reach the at least one electrical conductor segment 30 different from the pair of first electrical conductor segments 30. Consequently, the insulating coat 35 of the at least one electrical conductor segment 30 different from the pair of first electrical conductor segments 30 can be locally removed by heat of the laser beam. As a result, it becomes possible to suitably form the coat-removed portion 39 in the at least one electrical conductor segment 30 different from the pair of first electrical conductor segments 30, thereby allowing heat of the at least one electrical conductor segment 30 to be suitably dissipated through the coat-removed portion 39.

In the present embodiment, at the second coil end part CE2, the exposed portions 33 of the pair of first electrical conductor segments 30 are laser-welded together in the state of being radially overlapped with each other. In the at least one electrical conductor segment 30 different from the pair of first electrical conductor segments 30, the coat-removed portion 39 is formed in a wider range in the longitudinal direction of the at least one electrical conductor segment 30 than the overlap range in which the exposed portions 33 of the pair of first electrical conductor segments 30 are radially overlapped with each other (see FIG. 11).

With the coat-removed portion 39 formed in the wider range than the overlap range between the exposed portions 33 of the pair of first electrical conductor segments 30, it becomes possible to enhance the heat dissipation of the at least one electrical conductor segment 30 through the coat-removed portion 39.

In the present embodiment, the at least one electrical conductor segment 30 different from the pair of first electrical conductor segments 30 includes a pair of second electrical conductor segments 30A arranged respectively on opposite radial sides of the boundary between the exposed portions 33 of the pair of first electrical conductor segments 30 (see FIGS. 8 and 10). In the pair of second electrical conductor segments 30A, the coat-removed portions 39 are formed in the opposing surfaces of the pair of second electrical conductor segments 30A as well as in the axially-outer side surfaces of the pair of second electrical conductor segments 30A. The opposing surfaces of the pair of second electrical conductor segments 30A are radially opposed to each other; and the axially-outer side surfaces of the pair of second electrical conductor segments 30A face the exposed portions 33 of the pair of first electrical conductor segments 30 in the axial direction (i.e., the laser irradiation direction Y).

With the above arrangement of the pair of second electrical conductor segments 30A, during the laser welding of the exposed portions 33 of the pair of first electrical conductor segments 30, the laser beam penetrates the exposed portions 33 to reach the pair of second electrical conductor segments 30A. Consequently, both the insulating coats 35 of the pair of second electrical conductor segments 30A can be locally removed by heat of the laser beam. As a result, it becomes possible to suitably form the coat-removed portions 39 in the opposing surfaces of the pair of second electrical conductor segments 30A as well as in the axially-outer side surfaces of the pair of second electrical conductor segments 30A.

In the present embodiment the at least one electrical conductor segment 30 different from the pair of first electrical conductor segments 30 further includes a third electrical conductor segment 30B arranged so as to overlap, in the axial direction, the boundary between the exposed portions 33 of the pair of first electrical conductor segments 30 (see FIGS. 8 and 10). In the third electrical conductor segment 30B, the coat-removed portion 39 is formed in the axially-outer side surface of the third electrical conductor segment 30B which faces the exposed portions 33 of the pair of first electrical conductor segments 30 in the axial direction (i.e., the laser irradiation direction Y).

With the above arrangement of the third electrical conductor segment 30B, during the laser welding of the exposed portions 33 of the pair of first electrical conductor segments 30, the laser beam penetrates the exposed portions 33 to reach the third electrical conductor segment 30B. Consequently, the insulating coat 35 of the third electrical conductor segment 30B can be locally removed by heat of the laser beam. As a result, it becomes possible to suitably form the coat-removed portion 39 in the axially-outer side surface of the third electrical conductor segment 30B. Moreover, with the above arrangement of the third electrical conductor segment 30B, although the laser beam penetrates the exposed portions 33 of the pair of first electrical conductor segments 30, it is blocked by the third electrical conductor segment 30B from reaching the stator core 11. Consequently, it becomes possible to protect the stator core 11 from the laser beam.

In the present embodiment, the method of manufacturing the stator 10 includes: the assembly step of assembling the electrical conductor segments 30 to the stator core 11; and the welding step of laser-welding each corresponding pair of the exposed portions 33 of the electrical conductor segments 30 by irradiating the laser beam in the laser irradiation direction Y to the overlap part Fa between the pair of the exposed portions 33. Moreover, in the welding step, the coat-removed portions 39 are formed by heat of the laser beam in the second and third electrical conductor segments 30A and 30B arranged behind the pair of exposed portions 33 in the laser irradiation direction Y. In the coat-removed portions 39, the insulating coats 35 are removed from the second and third electrical conductor segments 30A and 30B (see FIGS. 8 and 10).

With the above method, in the welding step, the coat-removed portions 39 are formed in the second and third electrical conductor segments 30A and 30B by heat of the laser beam irradiated to the overlap part Fa between the pair of the exposed portions 33. As a result, it becomes possible to suitably manufacture the stator 10 capable of improving the cooling performance at the second coil end part CE2.

Moreover, in the present embodiment, in the assembly step, the electrical conductor segments 30 are assembled to the stator core 11 so that at the second coil end part CE2, each corresponding pair of the exposed portions 33 of the electrical conductor segments 30 are radially overlapped with each other. In the welding step, for each corresponding pair of the exposed portions 33 of the electrical conductor segments 30, the laser beam is traversed in the laser traversing range L1 wider than the overlap range in which the pair of the exposed portions 33 are radially overlapped with each other, thereby forming the coat-removed portions 39 in the second and third electrical conductor segments 30A and 30B in a wider range in the longitudinal direction of the second and third electrical conductor segments 30A and 30B than the overlap range.

Consequently, with the coat-removed portions 39 formed in the wider range than the overlap range, it becomes possible to enhance the heat dissipation of the second and third electrical conductor segments 30A and 30B through the respective coat-removed portions 39.

While the above particular embodiment has been shown and described, it will be understood by those skilled in the art that various modifications, changes and improvements may be made without departing from the spirit of the present disclosure.

(1) For example, in the above-described embodiment, for each pair of first electrical conductor segments 30 whose exposed portions 33 are laser-welded together, on the stator core side of the exposed portions 33 of the pair of first electrical conductor segments 30, there are arranged a pair of second electrical conductor segments 30A and a third electrical conductor segment 30B. During the laser welding of the exposed portions 33 of the pair of first electrical conductor segments 30, the coat-removed portions 39 are formed in the second and third electrical conductor segments 30A and 30B by heat of the laser beam that penetrates the exposed portions 33 to reach the second and third electrical conductor segments 30A and 30B (see FIGS. 9 and 10).

As an alternative, for each pair of first electrical conductor segments 30 whose exposed portions 33 are laser-welded together, on the stator core side of the exposed portions 33 of the pair of first electrical conductor segments 30, there may be arranged only a pair of second electrical conductor segments 30A respectively on opposite radial sides of the boundary between the exposed portions 33.

As another alternative, for each pair of first electrical conductor segments 30 whose exposed portions 33 are laser-welded together, on the stator core side of the exposed portions 33 of the pair of first electrical conductor segments 30, there may be arranged only a third electrical conductor segment 30B so as to overlap, in the axial direction, the boundary between the exposed portions 33.

(2) In the above-described embodiment, the coat-removed portions 39 are formed in the covered portions 36 of the electrical conductor segments 30 by heat of the laser beam during the laser welding of each corresponding pair of the exposed portions 33 of the electrical conductor segments 30.

Alternatively, the coat-removed portions 39 may be formed in the covered portions 36 of the electrical conductor segments 30 before the welding step.

(3) In the above-described embodiment, the electrical conductor segments 30 are bent to have the end portions thereof extending along the circumferential direction; the exposed portions 33 are formed at the circumferentially-extending end portions of the electrical conductor segments 30; and each corresponding pair of the exposed portions 33 of the electrical conductor segments 30 are welded together to form the stator coil 12.

Alternatively, the electrical conductor segments 30 may be bent to have the end portions thereof extending axially outward; the exposed portions 33 may be formed at the axially-extending end portions of the electrical conductor segments 30; and each corresponding pair of the exposed portions 33 of the electrical conductor segments 30 may be welded together to form the stator coil 12.

(4) In the above-described embodiment, the stator coil 12 is segment-structured. That is, the stator coil 12 is formed of the electrical conductor segments 30.

Alternatively, the stator coil 12 may not be segment-structured. Specifically, each of the U-phase, V-phase and W-phase windings of the stator coil 12 may be formed of a plurality of continuous electrical conductor wires wound on the stator core 11. Each of the electrical conductor wires may have a pair of exposed portions 33 formed respectively at opposite end portions thereof and a covered portion 36 formed at the other portions thereof. Each corresponding pair of the exposed portions 33 of the electrical conductor wires may be welded together to form the phase winding. Moreover, in each of the covered portions 36 of the electrical conductor wires, there may be formed at least one coat-removed portion 39 where the insulating coat 35 is locally removed from the covered portion 36.

(5) In the above-described embodiment, the stator 10 includes the resin encapsulating member 41 that encapsulates part of the second coil end part CE2 of the stator coil 12 therein.

Alternatively, the resin encapsulating member 41 may be omitted from the configuration of the stator 10.

What is claimed is:
1. A stator comprising:
an annular stator core; and
a stator coil provided on the stator core,
wherein the stator coil is formed of a plurality of electrical conductor wires each including an electrical conductor and an insulating coat covering the electrical conductor,
each of the electrical conductor wires has a pair of exposed portions where the electrical conductor is exposed from the insulating coat and a covered portion where the electrical conductor is covered with the insulating coat, the pair of exposed portions being formed respectively at opposite end portions of the electrical conductor wire, the covered portion being formed at portions of the electrical conductor wire other than the end portions,
the stator coil has a coil end part protruding from an axial end face of the stator core, and
at the coil end part, (i) each corresponding pair of the exposed portions of different ones of the electrical conductor wires are welded together and (ii) each of the covered portions of the electrical conductor wires has a coat-removed portion, which is where the insulating coat is locally removed from the covered portion, formed at a position on the electrical conductor wire other than positions at which the exposed portions are formed so that the coat-removed portion is separated from the exposed portions by the insulating coat.

2. The stator as set forth in claim 1, wherein
at the coil end part, the electrical conductor wires are arranged to overlap one another in an axial direction, and
in each of the covered portions of the electrical conductor wires, the coat-removed portion is formed on an opposite side of the covered portion to the stator core in the axial direction.

3. The stator as set forth in claim 1, wherein
at the coil end part, there is provided a resin encapsulating member that is formed of an electrically insulative resin having a higher thermal conductivity than the insulating coats of the electrical conductor wires, and
in the resin encapsulating member, there are encapsulated, at least, the exposed portions and the coat-removed portions of the electrical conductor wires.

4. The stator as set forth in claim 1, wherein
at the coil end part, each of the corresponding pairs of the exposed portions of different ones of the electrical conductor wires are laser-welded together by irradiating a laser beam to the exposed portions from an opposite side of the exposed portions to the stator core in an axial direction,
the electrical conductor wires forming the stator coil include a pair of first electrical conductor wires, whose exposed portions are laser-welded together, and at least one electrical conductor wire that is different from the pair of first electrical conductor wires and is arranged on a stator core side of the exposed portions of the pair of first electrical conductor wires in the axial direction, and
in the at least one electrical conductor wire different from the pair of first electrical conductor wires, the coat-removed portion is formed to be adjacent to the exposed portions of the pair of first electrical conductor wires in the axial direction.

5. The stator as set forth in claim 4, wherein
the at least one electrical conductor wire different from the pair of first electrical conductor wires comprises a pair of second electrical conductor wires arranged respectively on opposite sides of a boundary between the exposed portions of the pair of first electrical conductor wires, and in the pair of second electrical conductor wires, the coat-removed portions are formed in opposing surfaces of the pair of second electrical conductor wires as well as in side surfaces of the pair of second electrical conductor wires, the opposing surfaces of the pair of second electrical conductor wires being opposed to each other, the side surfaces of the pair of second electrical conductor wires facing the exposed portions of the pair of first electrical conductor wires in the axial direction.

6. The stator as set forth in claim 4, wherein the at least one electrical conductor wire different from the pair of first electrical conductor wires comprises a third electrical conductor wire arranged so as to overlap, in the axial direction, a boundary between the exposed portions of the pair of first electrical conductor wires, and in the third electrical conductor wire, the coat-removed portion is formed in a side surface of the third electrical conductor wire, the side surface of the third electrical conductor wire facing the exposed portions of the pair of first electrical conductor wires in the axial direction.

7. A stator comprising:

an annular stator core; and a stator coil provided on the stator core, wherein the stator coil is formed of a plurality of electrical conductor wires each including an electrical conductor and an insulating coat covering the electrical conductor, each of the electrical conductor wires has a pair of exposed portions where the electrical conductor is exposed from the insulating coat and a covered portion where the electrical conductor is covered with the insulating coat, the pair of exposed portions being formed respectively at opposite end portions of the electrical conductor wire, the covered portion being formed at portions of the electrical conductor wire other than the end portions, the stator coil has a coil end part protruding from an axial end face of the stator core, at the coil end part, (i) each corresponding pair of the exposed portions of different ones of the electrical conductor wires are welded together and (ii) each of the covered portions of the electrical conductor wires has a coat-removed portion where the insulating coat is locally removed from the covered portion, at the coil end part, each of the corresponding pairs of the exposed portions of different ones of the electrical conductor wires are laser-welded together by irradiating a laser beam to the exposed portions from an opposite side of the exposed portions to the stator core in an axial direction, the electrical conductor wires forming the stator coil include a pair of first electrical conductor wires, whose exposed portions are laser-welded together, and at least one electrical conductor wire that is different from the pair of first electrical conductor wires and is arranged on a stator core side of the exposed portions of the pair of first electrical conductor wires in the axial direction, in the at least one electrical conductor wire different from the pair of first electrical conductor wires, the coat-removed portion is formed to be adjacent to the exposed portions of the pair of first electrical conductor wires in the axial direction, at the coil end part, the exposed portions of the pair of first electrical conductor wires are laser-welded together in a state of being radially overlapped with each other, and in the at least one electrical conductor wire different from the pair of first electrical conductor wires, the coat-removed portion is formed in a wider range in a longitudinal direction of the at least one electrical conductor wire than an overlap range in which the exposed portions of the pair of first electrical conductor wires are radially overlapped with each other.

8. A method of manufacturing a stator, wherein the stator comprises an annular stator core and a stator coil provided on the stator core, the stator coil is formed of a plurality of electrical conductor wires each including an electrical conductor and an insulating coat covering the electrical conductor, the stator coil has a coil end part which protrudes from an axial end face of the stator core and at which the electrical conductor wires are arranged to overlap one another in an axial direction, each of the electrical conductor wires has a pair of exposed portions where the electrical conductor is exposed from the insulating coat, the pair of exposed portions being formed respectively at opposite end portions of the electrical conductor wire, and at the coil end part, each corresponding pair of the exposed portions of different ones of the electrical conductor wires are laser-welded together, the method comprising:

an assembly step of assembling the electrical conductor wires to the stator core; and a welding step of laser-welding each of the corresponding pairs of the exposed portions of different ones of the electrical conductor wires by irradiating a laser beam in a laser irradiation direction to an overlap part between the pair of the exposed portions, wherein in the welding step, a coat-removed portion is formed by heat of the laser beam in at least one of the plurality of electrical conductor wires arranged behind the pair of the exposed portions in the laser irradiation direction, at the coat-removed portion, the insulating coat is removed from the at least one electrical conductor wire, in the assembly step, the electrical conductor wires are assembled to the stator core so that, at the coil end part, each of the corresponding pairs of the exposed portions of different ones of the electrical conductor wires are radially overlapped with each other, and in the welding step, for each of the corresponding pairs of the exposed portions of different ones of the electrical conductor wires, the laser beam is traversed in a laser traversing range wider than an overlap range in which the pair of the exposed portions are radially overlapped with each other, thereby forming the coat-removed portion in the at least one electrical conductor wire in a wider range in a longitudinal direction of the at least one electrical conductor wire than the overlap range.

\* \* \* \* \*